United States Patent Office 3,364,194
Patented Jan. 16, 1968

3,364,194
METALLIFEROUS DISAZO-DYESTUFFS
Fritz Meininger, Frankfurt am Main, and Hans Helmut Steuernagel, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Aug. 4, 1964, Ser. No. 387,485
Claims priority, application Germany, Aug. 8, 1963, F 40,499
6 Claims. (Cl. 260—148)

The present invention relates to water-soluble, metal-containing disazo-dyestuffs and to a process for preparing them; more particularly, it relates to water-soluble complex metal compounds of disazo-dyestuffs of the general formula

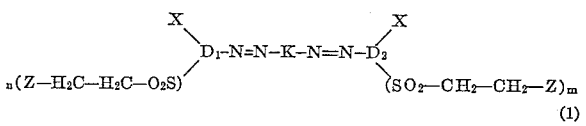

or

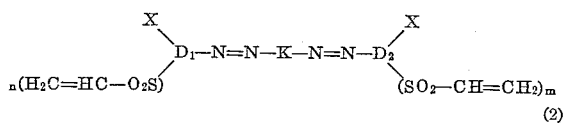

wherein K represents the bivalent radical of a coupling component of the resorcinol series, Z represents an inorganic or organic radical capable of being split off by an alkaline agent, one X standing in o-position to the azo group represents a hydroxyl, methoxyl or carboxyl group, the other X standing likewise in o-position to the azo group represents a hydrogen atom or a hydroxyl, methoxyl or carboxyl group, $D_1$ and $D_2$ represent equal or different substituted or unsubstituted phenyl or naphthyl radicals, of which at least one contains at least one grouping of the formula $$-SO_2-CH_2-CH_2-Z \quad (3)$$

or $$-SO_2CH=CH_2 \quad (4)$$

$n$ and $m$ represent 0 or 1, the sum of $n$ and $m$ being at least 1, and at least one of the radicals $D_1$, $D_2$ and K contains at least one group imparting solubility in water.

It has now been found that valuable water-soluble metal-containing disazo-dyestuffs which in their metal-free form correspond to the general formula

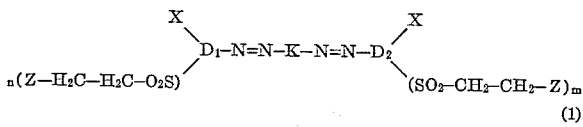

or

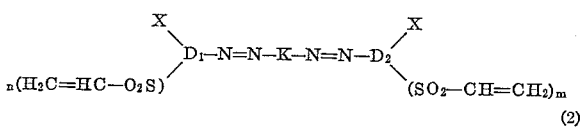

wherein K represents the bivalent radical of a coupling component of the resorcinol series, Z represents an inorganic or organic radical capable of being split off by an alkaline agent, one X standing in o-position to the azo group represents a hydroxyl, methoxyl or carboxyl group, the other X standing likewise in o-position to the azo group represents a hydrogen atom or a hydroxyl, methoxyl or carboxyl group, $D_1$ and $D_2$ represent equal or different substituted or unsubstituted phenyl or naphthyl radicals, of which at least one contains the grouping $$-SO_2-CH_2-CH_2-Z \quad (3)$$

or $$-SO_2-CH=CH_2 \quad (4)$$

$n$ and $m$ represent 0 or 1, the sum of $n$ and $m$ being at least 1, and at least one of the radicals $D_1$, $D_2$ and K contains at least one group imparting solubility in water, can be prepared by combining 2 mols of equal or different diazo compounds of the benzene or naphthalene series which may contain groups imparting solubility in water and of which at least one contains in o-position to the amino group a hydroxy, methoxy or carboxy group and at least one contains the reactive group (3) or (4), with one mol of 1,3-dihydroxybenzene or a derivative thereof which is capable of coupling twice and may contain groups imparting solubility in water, and by treating the water-soluble disazo-dyestuffs thus obtained with an agent yielding metal.

The following compounds may serve as examples for the diazo components of the benzene and naphthalene series suitable for preparing the initially metal-free disazo-dyestuffs according to the process of the present invention:

1-aminobenzene-4-(β-hydroxyethylsulfone)-sulfuric acid ester,
1-aminobenzene-3-(β-hydroxyethylsulfone)-sulfuric acid ester,
1-aminobenzene-4-(β-diethylamino-ethylsulfone),
2-amino-1-hydroxylbenzene-4-(β-hydroxyethylsulfone),
2-amino-1-hydroxybenzene-5-(β-hydroxylethylsulfone)-sulfuric acid ester,
2-amino-1-carboxybenzene-4-(β-hydroxyethylsulfone)-sulfuric acid ester,
2-amino-1-sulfobenzene-4-(β-hydroxyethylsulfone)-sulfuric acid ester,
2-amino-1-methoxybenzene-4-(β-hydroxyethylsulfone)-sulfuric acid ester,
2-amino-1-methoxybenzene-5-(β-hydroxyethylsulfone)-sulfuric acid ester,
2-amino-1-methoxybenzene-4-(β-chloroethylsulfone),
1-aminobenzene-3-(β-sulfophenoxy-ethylsulfone),
1-aminonaphthalene-4-(β-hydroxyethylsulfone)-sulfuric acid ester,
Aniline-4-sulfonic acid,
Aniline-3-sulfonic acid,
Aniline-2,4-disulfonic acid,
Aniline-2,5-disulfonic acid,
Aniline-3,5-disulfonic acid,
1-naphthylamine-4-sulfonic acid,
1-naphthylamine-3,7-disulfonic acid,
1-naphthylamine-4,6-disulfonic acid,
1-naphthylamine-4,7-disulfonic acid,
1-naphthylamine-5,7-disulfonic acid,
1-naphthylamine-3,6-disulfonic acid,
2-naphthylamine-4,7-disulfonic acid,
2-naphthylamine-5,7-disulfonic acid,
2-naphthylamine-4,8-disulfonic acid,
2-aminophenol-4-sulfonic acid,
2-aminophenol-5-sulfonic acid,
2-aminophenol-4,6-disulfonic acid,
1-amino-2-hydroxynaphthalene-4,6-disulfonic acid.

The diazo component has to be chosen so as to ensure that at least one of the diazo components contained in the final disazo-dyestuff molecule contains one of the characteristic groupings (3) or (4). The metal-free disazo-dyestuffs of the general Formula 1 or 2 are also obtained when carrying out the process of the invention by using diazo components containing instead of grouping (3) or (4) a substituent capable of being transformed into one of the groupings (3) or (4) after the formation of the dyestuff is finished. A substituent of this kind is, for example, the β-hydroxyethyl sulfone group which is esterified with sulfuric acid when the disazo-dyestuff formation is finished, and, if a conversion into group (4) is desired, is transformed into the vinyl sulfone group by means of an acid-binding agent such as sodium hydroxide solution. Moreover, the two diazo components and the coupling component should be chosen so that at least one of the three components contains a group imparting solubility in water, for example the acid sulfuric acid ester group, the sulfonic acid group, the carboxylic acid group, the sulfonic acid amide group or the N,N-dimethyl-sulfonic acid amide group. The number of groups imparting solubility in water which are present in the finished disazo-dyestuff molecule should be such as to ensure sufficient solubility in water. The increased solubility in water shown by metallized disazo-dyestuff molecules in the case of complex cobalt or chromium compounds can certainly be taken into account.

As suitable coupling components of the resorcinol series there may be mentioned for example 1,3-dihydroxy-benzene, 1,3-dihydroxy-4-methylbenzene, 1,3-dihydroxy-benzene-4-carboxylic acid or 1,3-dihydroxybenzene-4-sulfonic acid.

Resorcinol or the derivatives thereof which are capable of coupling twice couple in 2,4-position or in 4,6-position. Whereas in the case of a coupling in 4,6-position the sequence of the coupling reaction of the coupling component mentioned above with the diazonium salts of two different aromatic amines is insignificant, because in this case all the products obtained are identical, in the case of the double coupling in 2,4-position there are obtained, depending on the sequence of the coupling reaction with the diazonium salts of the two different aromatic amines, disazo-dyestuffs differing, for example, partly in shade.

As inorganic radicals Z which are split off by the action of agents having an alkaline reaction, there may be mentioned, for example, halogen atoms, such as a chlorine or a bromine atom, or the acid sulfuric acid ester group, alkylsulfonic acid ester groups or arylsulfonic acid ester groups, as well as acyloxy groups such as the acetoxy group, moreover aryloxy groups, dialkylamino groups such as the dimethylamino group or the diethylamino group, as well as alkylated ammonium groupings such as the trimethyl or triethyl ammonium group, or the pyridinium group may serve as examples for organic radicals Z.

The so prepared disazo-dyestuffs of the general Formula 1 or 2 are then treated with a metal-yielding agent. As agents yielding metal there may be used, above all, cobalt, chromium, copper or nickel salts, such as chromium sulfates, cobalt acetate, cobalt sulfate, copper acetate and nickel sulfate. There may also be used metal-yielding agents which contain complex-bound metal, for example complex chromium or cobalt compounds of aliphatic hydroxycarboxylic acids such as citric or tartaric acid or dicarboxylic acids, moreover complex chromium compounds of aromatic o-hydroxycarboxylic acids such as salicylic acid.

The reaction of the disazo-dyestuffs prepared according to the invention with the agents yielding metal is advantageously carried out in the heat, for example by heating the disazo-dyestuffs in an aqueous medium in a weakly acid to neutral range to temperatures between about 40° and 130° C., if desired with reflux cooling or in a closed vessel. As regards the ratio metal:azo dyestuff the metal-containing disazo-dyestuffs obtainable according to the invention constitute 1:1-complex compounds when using copper and nickel compounds and in the majority of cases 1:2-complex compounds when using cobalt and chromium compounds.

As a variation of the process described, the new metal-containing disazo-dyestuffs may be prepared by combining 1 mol of a metal-containing monoazo dyestuff which in its metal-free form corresponds to the general formula

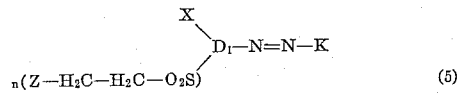 (5)

or

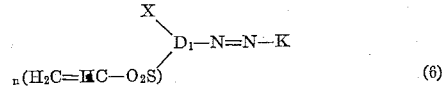 (6)

(in which K, X, $D_1$, Z and $n$ are defined as above) and contains for example one nickel or copper atom or one half chromium or cobalt atom per mol, with 1 mol of a diazo compound of the general formula

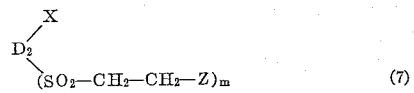 (7)

or

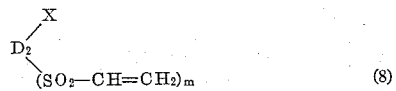 (8)

(in which $D_2$, X, Z and $m$ are defined as above) and, if desired, by treating the metal-containing disazo-dyestuff obtained with an agent yielding metal.

The dyestuffs obtained according to the process of the invention are suitable for dyeing and printing materials consisting of natural or regenerated cellulose such as cotton, linen or staple fiber. The fibrous materials mentioned are dyed or printed in the presence of acid-binding agents, if desired, in connection with a heat treatment, according to the dyeing and printing processes for reactive dyestuffs generally used in industry.

The dyeings and prints obtained with the new dyestuffs when applied to fibrous materials made of cellulose are generally distinguished by a good to very good fastness to light and by very good wet fastness properties, especially by a good fastness to washing.

The following examples serve to illustrate the invention but they are not intended to limit it thereto, the parts being by weight unless otherwise mentioned and the relationship of parts by weight to parts by volume being that of the kilogram to the liter.

*Example 1*

(a) 173 parts of aniline-4-sulfonic acid are diazotized in 800 parts of water and 160 parts of 37% by weight hydrochloric acid with 172.5 parts of a 40% by weight sodium nitrite solution. Then the pH-value of the diazo solution is adjusted to 3–4 by means of sodium acetate and the mixture is added to a cold solution of 120 parts of resorcinol in 200 parts of water. After stirring for some hours at 0–5° C., the pH-value being 3 to 4, the dyestuff formed is salted out by means of sodium chloride, filtered with suction and washed with concentrated sodium chloride solution until free from resorcinol.

(b) 217 parts of 2-amino-1-hydroxybenzene 4-(β-hydroxyethyl-sulfone) are introduced, at 70–80° C., into 360 parts by volume of concentrated sulfuric acid and stirred for 30 minutes at this temperature. Then the mixture is poured on 2000 parts of finely ground ice and diazotized by an addition of 245 parts by volume of an aqueous 4 N-sodium nitrite solution. When the diazotization is finished the pH-value is adjusted to 6.5–6.8 by adding solid sodium bicarbonate. The so obtained solution is added to a suspension of the moist monoazo dyestuff obtained as described sub (a) in 1000 parts of water. Then the coupling is completed, while stirring, at 0–20°

C. and a pH-value of 6–7. The dyestuff obtained, which has the following formula

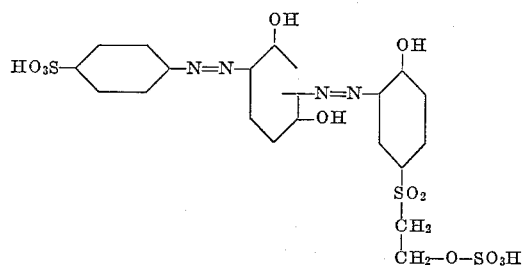

is salted out with sodium chloride, filtered off with suction and eventually washed with concentrated sodium chloride solution.

(c) The moist disazo-dyestuff obtained as sub (b) is stirred in 1500 parts of water. 250 parts of crystallized copper sulfate and 400 parts of sodium acetate containing crystal water are added and the whole is stirred for some hours at room temperature until the disazo-dyestuff is completely converted into the copper complex; this is the case when the metal-free dyestuff does no longer appear on the paper chromatogram.

Then the dyestuff is salted out with sodium chloride, the separated dyestuff is filtered off and washed with a sodium chloride solution. Finally, the filter residue is dried and a brown powder is obtained.

(d) 2 parts of the dried dyestuff powder obtained as sub (c) are stirred with 15 parts of water, 5 parts of urea, 1 part of sodium bicarbonate and 27 parts of an aqueous 4% by weight alginate thickening to yield a printing paste. This printing paste is printed on cotton and the print is dried at 60° C., steamed for 5 minutes at 98–103° C. washed with water and soap solution and dried. A red brown print is obtained having a very good fastness to light and good wet fastness properties.

(e) When using for the metallization according to (c) 281 parts of crystallized nickel sulfate instead of 250 parts of copper sulfate and heating the whole to 80–90° C., the complex nickel compound of the disazo-dyestuff is obtained which yields a yellowish brown print on cotton.

(f) When using for the metallization as described sub (c) 250 parts of chromium alum instead of 250 parts of copper sulfate and heating the whole to 80–90° C., the chromium complex of the disazo-dyestuff mentioned above is obtained, which yields a deep brown print on cotton.

(g) It is also possible to dispense with the separation of the dyestuff by salting out and filtration as described sub (b); in this case the copper sulfate and the sodium acetate are added directly to the solution and subsequently the copper complex of the disazo-dyestuff is salted out.

*Example 2*

(a) 243 parts of benzoxazolone - 6 - β - hydroxyethylsulfone are introduced into 820 parts of 95% by weight sulfuric acid and heated to 135–140° C. The whole is stirred at this temperature for 3–4 hours, cooled at 20° C. and the solution obtained is poured on a mixture of 2400 parts of finely ground ice and 1000 parts of water. Subsequently, the whole is neutralized at 0–5° C. with concentrated sodium carbonate solution, filtered off and the filtrate mixed with 200 parts of 37% by weight of hydrochloric acid. The product is then diazotized at 0–5° C. by adding 172.5 parts of a 40% by weight sodium nitrate solution. It is then neutralized by means of sodium bicarbonate and added to 120 parts of resorcinol in 200 parts of water. The coupling is completed at a pH-value of 6–7 and the dyestuff formed is salted out with potassium chloride. It is filtered off with suction and washed with a diluted aqueous potassium chloride solution until free from resorcinol.

(b) 173 parts of 1 aminobenzene-4-sulfonic acid are diazotized according to Example 1(a). The pH-value of the diazo dyestuff obtained is adjusted to 4. To this solution the moist dyestuff obtained as described sub (a) is added and the coupling is completed at 0–10° C., the pH-value being maintained at 5–6 by means of concentrated aqueous sodium acetate solution. The dyestuff obtained, which has the formula

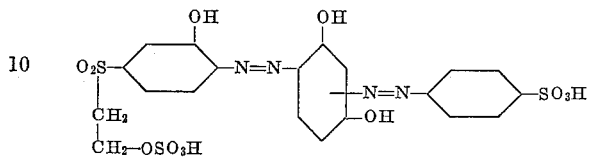

is salted out with potassium chloride, filtered off with suction and washed with an aqueous potassium chloride solution.

(c) The moist dyestuff obtained as described sub (b) is stirred in 1000 parts of water and mixed with 140 parts of crystallized cobalt sulfate. The pH-value of this solution is adjusted to 5–6 by means of sodium acetate or another compound having an alkaline reaction, and the whole is stirred at 60–70° C. The cobalt complex dyestuff formed is salted out with potassium chloride and filtered off. When applied to cotton the dyestuff yields a violet-tinged brown print having a very good fastness to light and a good fastness to washing.

(d) Another way of carrying out the process of the invention is to convert the dyestuff obtained as described sub (a) in 1000 parts of water by means of 140 parts of crystallized cobalt sulfate, at 60–70° C. and a pH-value of 5–6, into the monoazo-cobalt complex dyestuff and to treat this dyestuff further as described sub (b). Eventually, the disazo-cobalt complex dyestuff is obtained by salting out.

*Example 3*

(a) 189 parts of 2-aminophenol-5-sulfonic acid are stirred with 190 parts of 37% by weight hydrochloric acid, mixed with 1000 parts of ice after 30 minutes and diazotized with 172.5 parts of a 40% by weight sodium nitrite solution at a temperature below 5° C. The whole is neutralized and poured to 120 parts of resorcinol in 200 parts of water, while stirring. The coupling is completed at 0–20° C. and with a pH-value of 6–7, then the dyestuff formed is salted out by means of sodium chloride and filtered with suction. Finally, the isolated dyestuff is washed with a diluted aqueous potassium chloride solution until free from resorcinol.

(b) 282 parts of 3-aminobenzene-1-(β-hydroxyethylsulfone)-sulfuric acid ester are dissolved in 2500 parts of water. The solution is neutralized by adding sodium bicarbonate, subsequently mixed with 180 parts of a 40% by weight sodium nitrite solution and poured on 240 parts of 37% by weight hydrochloric acid and 1000 parts of ice, while stirring. Any excess nitrite which may be present is destroyed by means of amidosulfonic acid. Then the pH-value is adjusted to 5 and the moist monoazo dyestuff prepared as described sub (a) is added. Then the whole is stirred at 0–5° C. until the coupling is complete, the pH-value being maintained at 5–6 by a dropwise addition of an aqueous sodium acetate solution. The dyestuff formed, which has the formula

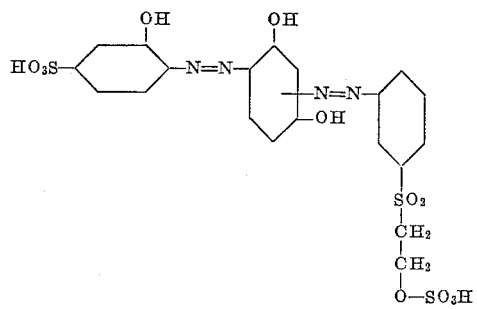

is salted out by means of potassium chloride, filtered with suction and washed with an aqueous potassium chloride solution.

(c) The moist dyestuff obtained as described sub (b) is converted at 80–90° C., in 2000 parts of water with 250 parts of chromium alum and with a pH-value in the range from 5 to 6, into the chromium complex, salted out by means of potassium chloride and filtered off. When applied to cotton the dyestuff produces a brown dyeing having a good fastness to light and washing.

Example 4

(a) 217 parts of 2-amino-1-hydroxybenzene-4-(β-hydroxyethyl-sulfone) are diazotized at 0–5° C. in 800 parts of water and 235 parts of 37% by weight hydrochloric acid by means of 172.5 parts of a 40% by weight sodium nitrite solution. Subsequently, the solution is neutralized by means of concentrated sodium carbonate solution and added to 120 parts of resorcinol in 200 parts of water. Then the whole is stirred at a pH-value of 6–7 until the coupling is complete, the pH-value is adjusted with concentrated hydrochloric acid, then the whole is stirred for another 4 hours and the precipitated dyestuff is filtered off.

(b) 182 parts of aniline-4-sulfonic acid are diazotized with 181 parts of a 40% by weight sodium nitrite solution in 900 parts of water and 170 parts of 37% by weight of hydrochloric acid. The diazo solution obtained is neutralized, subsequently poured, while vigorously stirring, into a cold solution of the moist dyestuff obtained as described sub (a) in 350 parts of a 33% by weight sodium hydroxide solution and 1700 parts of water and after one hour concentrated hydrochloric acid is added to the mixture until it shows an acid reaction to Congo paper. Then the dyestuff formed is salted out with sodium chloride. Finally, the separated dyestuff is filtered with suction, washed with concentrated sodium sulfate solution until free from chlorine ions and dried.

(c) The dry dyestuff obtained as described sub (b) is introduced at 70–80° C. into 1800 parts of 90% by weight sulfuric acid and stirred at this temperature. The sulfuric acid ester thus obtained is then poured on 5000 parts of ice, salted out with potassium chloride and filtered with suction. Eventually, the filtered dyestuff, which corresponds to the formula

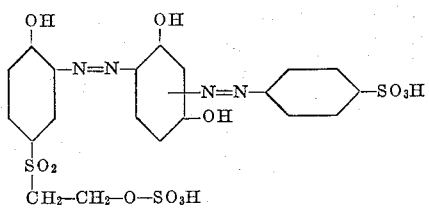

is washed with a potassium chloride solution until it shows a neutral reaction to Congo paper.

(d) The moist dyestuff obtained as described sub (c) is converted in 1000 parts of water with 250 parts of crystallized copper sulfate, at room temperature and with a pH-value in the range from 5 to 6, into the copper complex, which is then salted out by means of potassium chloride and eventually filtered off.

When applied to cotton the dyestuff obtained in this manner produces a violet-tinged brown print which has a good fastness to light.

Example 5

When using in Example 1(a), instead of 173 parts of aniline-4-sulfonic acid, the same amount of aniline-3-sulfonic acid and proceeding as described in Example 1(a)–(c) a brown copper complex dyestuff is obtained having a good fastness to light and washing and corresponding in its metal-free form to the formula

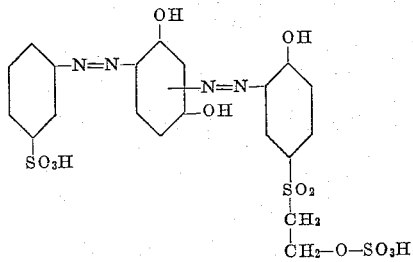

Example 6

(a) 253 parts of aniline-2,4-disulfonic acid are diazotized in the form of their sodium salt in 1000 parts of water and 240 parts of 37% by weight hydrochloric acid with 172.5 parts of a 40% by weight sodium nitrite solution and the pH-value of the solution is adjusted to 3–4. The diazo solution is added to 120 parts of resorcinol in 200 parts of water and the pH-value of the coupling mixture is kept in the range from 3 to 4 by means of a sodium acetate solution, at 0–5° C., until the coupling is complete. Subsequently, the dyestuff formed is salted out with potassium chloride, filtered with suction and eventually washed with a diluted, aqueous potassium chloride solution until free from resorcinol.

(b) The dyestuff obtained as described sub (a) is added in moist state to a solution containing 297 parts of 2-amino-1-hydroxybenzene-4-(β-hydroxyethyl-sulfone)-sulfuric acid ester in diazotized form. The coupling is effected at 0–20° C. and a pH-value of 6–7. The dyestuff formed, which has the formula

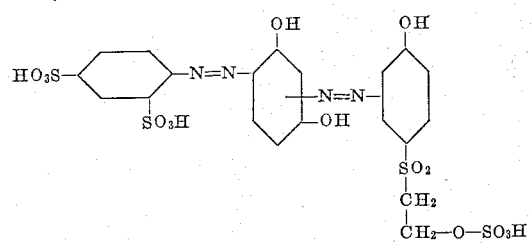

is salted out with potassium chloride and filtered off with suction.

(c) The dyestuff obtained as described sub (b) is converted in 1000 parts of water with 250 parts of crystallized copper sulfate at a pH-value of 5–6 and at 50–60° C. into the copper complex, which is subsequently salted out with potassium chloride and filtered off. When applied to cotton the dyestuff obtained produces a red brown dyeing and a red brown print.

(d) When using in the process described sub (c) 250 parts of chromium alum instead of 250 parts of copper sulfate and heating the whole to 80–90° C., a chromium complex dyestuff is obtained which produces a violet-tinged dyeing on cotton.

Example 7

(a) 303 parts of 1-aminonaphthalene-3,6-disulfonic acid are converted in 1000 parts of water, while adding sodium bicarbonate, into a neutral solution, then mixed with 180 parts of a 40% by weight sodium nitrite solution and poured, while stirring, on 250 parts of 37% by weight hydrochloric acid and 1200 parts of ice. After 30 minutes the excess nitrite is destroyed by means of amidosulfonic acid. The pH-value is then adjusted to 3 by means of sodium bicarbonate and 120 parts of resorcinol dissolved in 200 parts of water are added. The pH-value of the ice-cold solution is kept at 3–4 by means of a sodium acetate solution until the coupling is complete. Then the product is salted out with sodium chloride, the dyestuff formed is filtered with suction and washed with a sodium chloride solution until free from resorcinol.

(b) The moist dyestuff obtained as described sub (a) is coupled with 297 parts of diazotized 2-amino-1-hydroxy-benzene-4-(β-hydroxyethyl - sulfone)-sulfuric acid ester and subsequently converted with 250 parts of crystallized copper sulfate according to Example 1(c) into a disazo copper complex dyestuff. This dyestuff is then salted out by means of potassium chloride and filtered off with suction. When applied to cotton the dyestuff obtained yields brown dyeings and prints.

The metal-free disazo-dyestuff has the formula

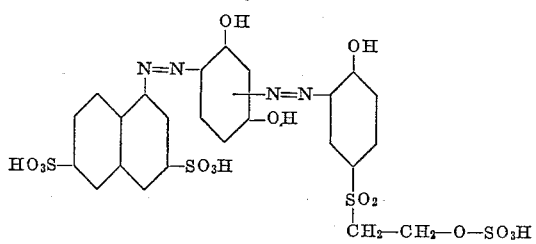

Example 8

(a) 189 parts of 2-aminophenol-4-sulfonic acid are stirred with 200 parts of 37% by weight hydrochloric acid, after 30 minutes mixed with 1200 parts of ice and diazotized with 172.5 parts of a 40% by weight sodium nitrite solution at a temperature below 5° C. The pH-value of the diazo solution is adjusted to 4–5 and added to 130 parts of 2,4-dihydroxy-toluene and 300 parts of water. The pH-value is kept at 4–5 by adding a sodium acetate solution and when the coupling is complete the azo dyestuff formed is salted out with sodium chloride. It is then filtered with suction and washed with a sodium chloride solution.

(b) 282 parts of 4-aminobenzene-1-(β-hydroxyethyl-sulfone)-sulfuric acid ester are dissolved in 1800 parts of water and neutralized with sodium bicarbonate. After addition of 180 parts of a 40% by weight sodium nitrite solution the solution is poured, while stirring, on 240 parts of 37% by weight hydrochloric acid and 1000 parts of ice. After 30 minutes the excess nitrite is removed by adding amidosulfonic acid. The pH-value is then adjusted to 4–5 by means of concentrated sodium carbonate solution, at 0–5° C., and the moist dyestuff obtained as described sub(a) is added. Subsequently, the pH-value is adjusted to 5–6 by means of sodium bicarbonate and the coupling is completed at 0–5° C. The dyestuff formed, which has the formula

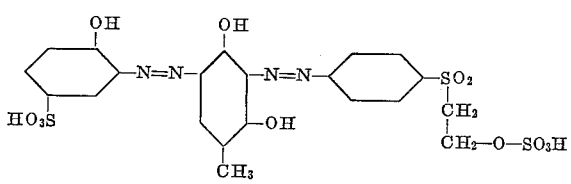

is salted out with potassium chloride and filtered with suction.

(c) The dyestuff obtained as described sub (b) is mixed with 250 parts of chromium alum in 1000 parts of water and heated at pH 5 to 6 to 80–90° C. The chromium complex dyestuff formed is salted out with potassium chloride. When applied to cotton the dyestuff yields a brown print having a good fastness to light and washing.

Example 9

(a) A monoazo dyestuff is prepared from 173 parts of aniline-4-sulfonic acid and 120 parts of resorcinol in the manner described in Example 1(a).

(b) 245 parts of 2-aminobenzoic acid-4-(β-hydroxyethyl-sulfone) are introduced, at 40° C., into 650 parts of concentrated sulfuric acid and stirred until completely dissolved. After having poured the solution on 2000 parts of ice it is diazotized at 0–5° C. with 172.5 parts of a 40% by weight sodium nitrite solution. Then the pH-value is adjusted to 5 by means of concentrated sodium carbonate solution and the moist dyestuff obtained as described sub (a) is introduced. The pH-value is adjusted to 6–7 by means of sodium bicarbonate and the coupling completed at 0–10° C. The dyestuff obtained, which has the formula

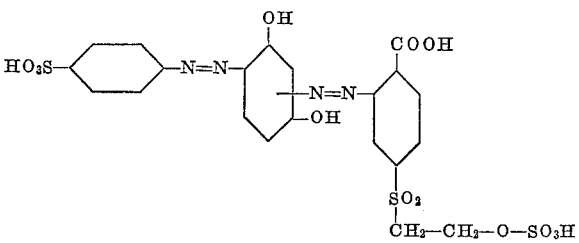

is salted out with sodium chloride and filtered with suction.

(c) The dyestuff obtained as described sub (b) is suspended in 1500 parts of water and mixed with 250 parts of crystallized copper sulfate. Then the pH-value is adjusted to 5–6 by means of sodium acetate and the whole is stirred at room temperature until the reaction into the copper complex is completed. Subsequently the dyestuff is salted out with sodium chloride. It dyes cotton yellow brown shades having a good to very good fastness to light.

Example 10

(a) 223 parts of 1-aminonaphthalene-4-sulfonic acid are dissolved in the form of their sodium salt in 1500 parts of water and mixed with 180 parts of a 40% by weight sodium nitrite solution. While stirring vigorously the solution is then poured on 250 parts of 37% by weight hydrochloric acid and 1000 parts of ice. After 30 minutes the excess nitrite is destroyed by adding amidosulfonic acid and the pH-value is adjusted to 2–3 by adding sodium bicarbonate. Then a solution of 120 parts of resorcinol in 200 parts of water is added and the pH-value is adjusted to 3–4 with concentrated aqueous sodium acetate solution. When the coupling is complete the dyestuff formed is salted out with sodium chloride, filtered with suction and washed with a sodium chloride solution.

(b) A solution having a pH-value of 5 to 6 is prepared which contains 297 parts of diazotized 2-amino-1-hydroxybenzene-5-(β-hydroxyethyl-sulfone)-sulfuric acid ester in the form of its sodium salt and the moist dyestuff prepared as described sub (a) is added. The pH-value is raised to 6–7 by an addition of sodium bicarbonate and the whole is stirred at a temperature in the range from 0 to 20° C. The dyestuff formed, which has the formula

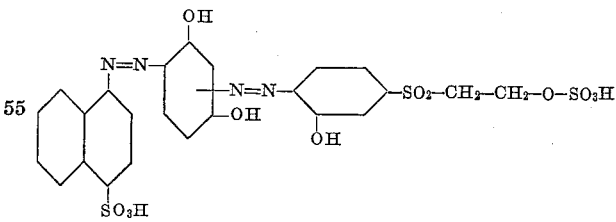

is salted out with sodium chloride, filtered with suction and washed with an aqueous sodium chloride solution.

(c) The moist dyestuff which is obtained in the manner described sub (b) is stirred in 3000 parts of water, mixed with 250 parts of chromium alum and heated at a pH-value of 5–6 to 80–90° C. The dyestuff formed is salted out, filtered with suction and dried.

When applied to cotton the chromium complex dyestuff obtained in this manner produces a deep brown print having a good to very good fastness to light and a good fastness to washing.

Example 11

(a) 189 parts of 2-aminophenol-5-sulfonic acid are stirred with 190 parts of 37% by weight hydrochloric acid, after 30 minutes mixed with 1000 parts of ice and diazotized with 172.5 parts of a 40% by weight sodium nitrite solution at a temperature below 5° C. The whole is neutralized and poured, while stirring, to 120 parts of resorcinol in 200 parts of water. The coupling is completed at 0–20° C. and a pH-value of 6–7, then the dyestuff formed is salted out with potassium chloride and filtered with suction. Eventually, the isolated dyestuff is washed with a diluted aqueous potassium chloride solution until free from resorcinol.

(b) 183 parts of 1-aminobenzene-4-vinylsulfone are diazotized with 172.5 parts of a 40% by weight sodium nitrite solution, at 0–5° C., in 100 parts of water and 240 parts of 37% by weight hydrochloric acid. Then the moist dyestuff obtained as described sub (a) is added, the pH-value is adjusted to 5–6 by means of sodium bicarbonate and the whole is stirred for 10 hours at 0–5° C. and for another 12 hours at room temperature. Subsequently, the dyestuff obtained, which has the formula

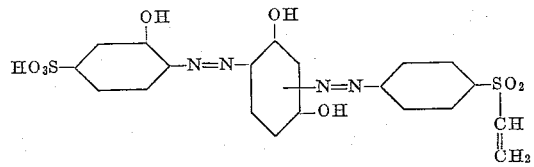

is salted out with potassium chloride and filtered with suction.

(c) The moist dyestuff obtained as described sub (b) is stirred in 1000 parts of water, mixed with 400 parts of sodium acetate containing crystal water and 141 parts of crystallized cobalt (II) sulfate and stirred at room temperature and at a pH-value of 5–6 until the chromatogram does no longer show any metal-free dyestuff.

Subsequently, the dyestuff obtained in this manner is salted out with potassium chloride, filtered with suction, washed with a sodium chloride solution and finally dried at 40° C. in a vacuum drying chamber.

A dark brown powder is obtained which, when applied to cotton, produces brown prints and dyeings having a good fastness to light and washing.

*Example 12*

152 parts of 2 - naphthylamine - 4,8-disulfonic acid are dissolved in 800 parts of water so that a neutral solution is obtained, 26 parts of sodium nitrite are added and the solution is added while stirring, to a mixture of 700 parts of ice and 120 parts of 37% by weight hydrochloric acid. Then the whole is stirred for one hour at 0–5° C., any excess nitrous acid that may be present is destroyed by means of amidosulfonic acid and the pH-value of the diazonium salt suspension is adjusted to 3.5–4.0 with an aqueous concentrated sodium carbonate solution. Then 55 parts of resorcinol are added and the whole is stirred at 0–5° C. and a pH-value of 3.5–4.0 until the coupling is complete. The dyestuff is salted out with sodium chloride and filtered with suction.

The moist filter cake is introduced into an aqueous neutral solution containing 149 parts of 2 - amino-1-hydroxybenzene - 4 - (β-hydroxyethyl-sulfone) - sulfuric acid ester in the form of its diazonium compound (prepared in analogous manner to that described in Example 1(b)).

The coupling is completed at 0–20° C. and a pH-value of 6.5–7.5 Then the disazo-dyestuff, which in the form of the free acid corresponds to the formula

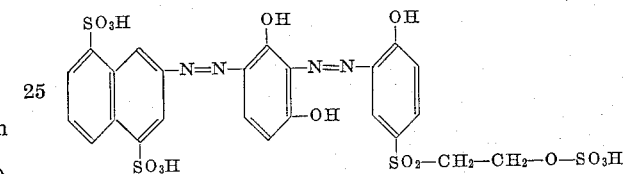

is mixed with 125 parts of copper sulfate containing crystal water and the pH-value is adjusted to 5–6 with concentrated sodium carbonate solution.

When the copper complex formation is finished the product is salted out with sodium chloride, filtered with suction and washed with a diluted sodium chloride solution. The dried dyestuff is obtained in the form of a brown dyestuff powder which dyes cotton reddish brown shades having good wet fastness properties and a very good fastness to light.

The following table specifies further metal-containing disazo dyestuffs obtainable according to the process of the invention and indicates the coupling components and disazo components used for their preparation, as well as the pH-ranges of the coupling reactions and the shades obtained with the final dyestuffs on cotton.

| No. | Coupling component | Diazo component of the first coupling | pH-range of the first coupling | Diazo component of the second coupling | pH-range of the second coupling | Metal | Tint |
|---|---|---|---|---|---|---|---|
| 1 | Resorcinol | 2-amino-1-hydroxybenzene-4-(β-hydroxyethylsulfone) sulfuric acid ester. | 5–7 | Aniline-4-sulfonic acid | 4–6 | Cu | Brown. |
| 2 | do | do | 5–7 | do | 4–6 | Co | Do. |
| 3 | do | do | 5–7 | do | 4–6 | Cr | Violet-tinged brown. |
| 4 | do | 2-amino-1-hydroxybenzene-4-(β-hydroxyethylsulfone) (Esterification with sulfuric acid is effected after the 2d coupling). | 5–7 | do | (¹) | Co | Brown. |
| 5 | do | Aniline-4-sulfonic acid | 3–4 | 2-amino-1-hydroxybenzene-5-(β-hydroxyethysulfone)-sulfuric acid ester. | 6–7 | Co | Red brown. |
| 6 | do | 2-aminophenol-4-sulfonic acid. | 5–7 | 3-aminobenzene-1-(β-hydroxyethylsulfone)-sulfuric acid ester. | 4–6 | Cr | Brown. |
| 7 | do | do | 5–7 | 4-aminobenzene-1-(β-hydroxyethylsulfone)-sulfuric acid ester. | 4–6 | Cr | Do. |
| 8 | do | Aniline-2,5-disulfonic acid | 3–4 | 2-amino-1-hydroxybenzene-5-(β-hydroxyethylsulfone)-sulfuric acid ester. | 6–7 | Cu | Do. |
| 9 | do | Aniline-3-sulfonic acid | 3–4 | do | 6–7 | Co | Do. |
| 10 | 2,4-di-hydroxytoluene | 2-aminophenol-4-sulfonic acid. | 4–6 | 3-aminobenzene-1-(β-hydroxyethylsulfone)-sulfuric acid ester. | 4–6.5 | Cu | Do. |
| 11 | do | do | 4–6 | do | 4–6.5 | Cr | Do. |
| 12 | Resorcinol | 1-aminonaphthalene-3,6-disulfonic acid. | 3–4 | 2-amino-1-hydroxybenzene-4-(β-hydroxyethylsulfone)-sulfuric acid ester. | 6–7 | Cr | Do. |
| 13 | do | do | 3–4 | do | 6–7 | Ni | Red brown. |
| 14 | 2,4-dihydroxytoluene | 2-aminophenol-4,6-disulfonic acid. | 5–6.5 | 4-aminobenzene-1-(β-hydroxyethylsulfone)-sulfuric acid ester. | 4–6 | Cu | Brown. |

| No. | Coupling component | Diazo component of the first coupling | pH-range of the first coupling | Diazo component of the second coupling | pH-range of the second coupling | Metal | Tint |
|---|---|---|---|---|---|---|---|
| 15 | 2,4-dihydroxybenzoic acid. | 2-amino-1-hydroxybenzene-5-(β-hydroxyethylsulfone)-sulfuric acid ester. | 5-7 | Aniline-4-sulfonic acid | 5-7 | Cu | Violet-tinged brown. |
| 16 | ___do___ | ___do___ | 5-7 | ___do___ | 5-7 | Co | Brown. |
| 17 | ___do___ | ___do___ | 5-7 | ___do___ | 5-7 | Ni | Red brown. |
| 18 | Resorcinol | 2-aminophenol-4-sulfonic acid. | 5-7 | 2-aminoaphthalene-5-(β-hydroxyethylsulfone)-sulfuric acid ester. | 5-7 | Cu | Red brown. |
| 19 | ___do___ | ___do___ | 5-7 | ___do___ | 5-7 | Co | Brown. |
| 20 | ___do___ | ___do___ | 5-7 | ___do___ | 5-7 | Cr | Do. |
| 21 | ___do___ | ___do___ | 5-7 | ___do___ | 5-7 | Ni | Do. |
| 22 | ___do___ | 2-amino-1-methoxybenzene-4-(β-hydroxy-ethylsulfone)-sulfuric acid ester. | 4-6 | Aniline-4-sulfonic acid | 4-6 | Cu | Do. |
| 23 | ___do___ | 1-amino-2-hydroxynaphthalene-4,6-disulfonic acid. | 5-7 | 4-aminobenzene-1-(β-hydroxyethylsulfone)-sulfuric acid ester. | 4-6 | Cu | Do. |
| 24 | 2,4-dihydroxybenzene-1-sulfonic acid. | 2-amino-1-hydroxybenzene-4-(β-hydroxyethylsulfone)-sulfuric acid ester. | 5-7 | Aniline-4-sulfonic acid | 4-6.5 | Cu | Do. |
| 25 | 1,3-dihydroxybenzene-4-sulfonic acid. | Aniline-4-sulfonic acid | 3-5 | 2-amino-1-methoxybenzene-4-(β-chloroethylsulfone). | 5-7 | Cu | Do. |
| 26 | ___do___ | ___do___ | 3-5 | 2-amino-1-methoxybenzene-4-(β-acetoxyethylsulfone). | 5-7 | Cu | Do. |
| 27 | Resorcinol | 2-aminophenol-4-sulfonic acid. | 6-7 | 1-aminobenzene-4-(β-diethylamino-ethylsulfone). | 5-6 | Cu | Do. |
| 28 | ___do___ | ___do___ | 6-7 | ___do___ | 5-6 | Cr | Do. |
| 29 | ___do___ | ___do___ | 6-7 | 1-aminobenzene-3-(β-sulfophenoxyethyl-sulfone). | 5-6 | Cr | Do. |
| 30 | ___do___ | Aniline-3,5-disulfonic acid | 3-4 | 2-amino-1-hydroxybenzene-5-(β-hydroxyethylsulfone)-sulfuric acid ester. | 6-7 | Cu | Do. |
| 31 | ___do___ | Aniline-2,5-disulfonic acid | 3-4 | 2-amino-1-hydroxybenzene-5-(β-hydroxy-ethylsulfone)-sulfuric acid ester. | 6-7 | Cr | Do. |
| 32 | ___do___ | Aniline-2,4-disulfonic acid | 3-4 | ___do___ | 6-7 | Cr | Do. |
| 33 | ___do___ | 1-aminonaphthalene-5,7-disulfonic acid. | 3-4 | ___do___ | 6-7 | Cr | Do. |
| 34 | ___do___ | 2-aminonaphthalene-5,7-disulfonic acid. | 3-4 | ___do___ | 6-7 | Cr | Do. |
| 35 | ___do___ | 2-aminonaphthalene-4,8-disulfonic acid. | 3-4 | ___do___ | 6-7 | Cr | Do. |
| 36 | ___do___ | 1-aminonaphthalene-3,6-disulfonic acid. | 3-4 | 2-amino-1-hydroxybenzene-4-(β-hydroxyethylsulfone)-sulfuric acid ester. | 6-7 | Co | Do. |
| 37 | ___do___ | 2-aminonaphthalene-5,7-disulfonic acid. | 3-4 | 2-amino-1-hydroxybenzene-4-(β-hydroxyethylsulfone)-sulfuric acid ester. | 6-7 | Cr | Do. |
| 38 | ___do___ | 2-aminonaphthalene-4,8-disulfonic acid. | 3-4 | ___do___ | 6-7 | Cr | Do. |
| 39 | ___do___ | Aniline-2,5-disulfonic acid | 3-4 | ___do___ | 6-7 | Cu | Do. |

[1] Above 10.

In their metal-free form the complex metal dyestuffs obtained according to the examples given in the above table correspond to the following structural formulae:

| Example of the table | Constitutional formula of the metal-free disazo-dyestuff |
|---|---|
| 1, 2, 3, 4 | HO–C₆H₃(SO₂–CH₂–CH₂–O–SO₃H)–N=N–C₆H₃(OH)(OH)–N=N–C₆H₄–SO₃H |
| 5 | SO₃H–C₆H₄–N=N–C₆H₂(OH)(OH)–N=N–C₆H₄–SO₂–CH₂–CH₂–O–SO₃H |

| Example of the table | Constitutional formula of the metal-free disazo-dyestuff |
|---|---|
| 6 | 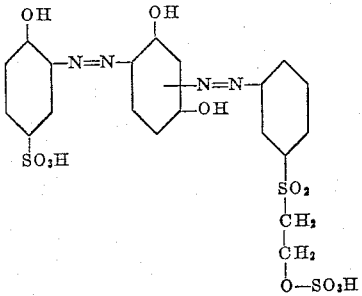 |
| 7 | 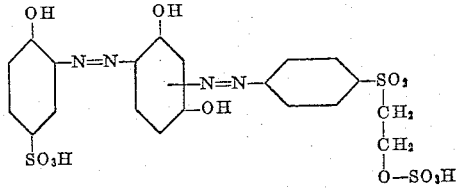 |
| 8 | 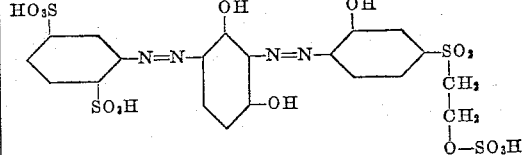 |
| 9 | 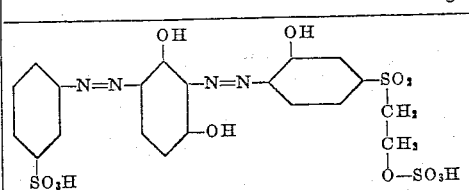 |
| 10, 11 | 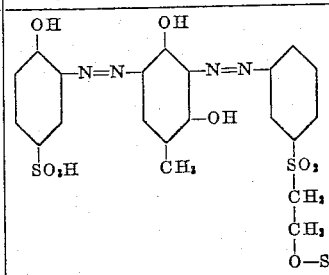 |
| 12, 13 | 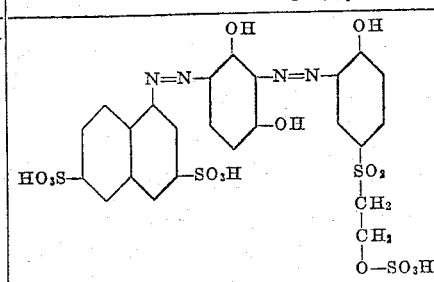 |
| 14 | 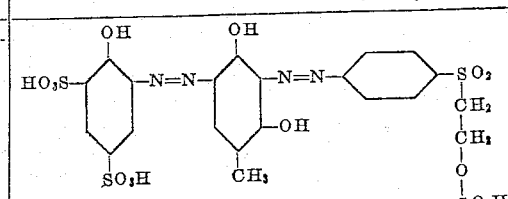 |

| Example of the table | Constitutional formula of the metal-free disazo-dyestuff |
|---|---|
| 15, 16, 17 | 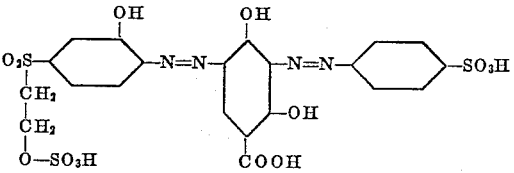 |
| 18, 19, 20, 21 | 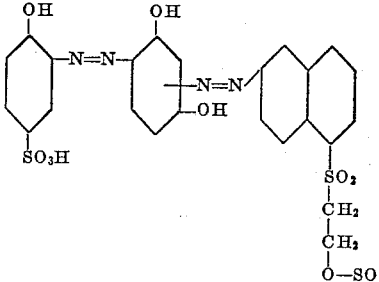 |
| 22 | 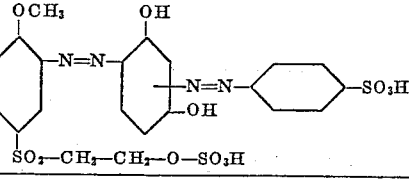 |
| 23 | 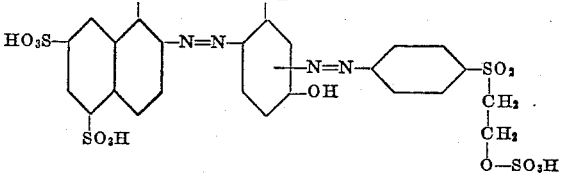 |
| 24 | 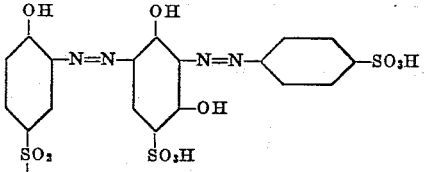 |
| 25 | 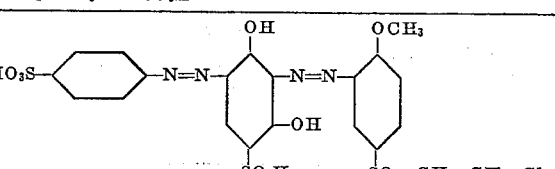 |
| 26 | 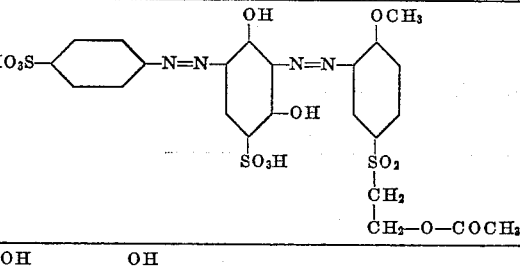 |
| 27, 28 | 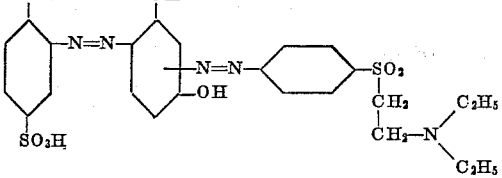 |

| Example of the table | Constitutional formula of the metal-free disazo-dyestuff |
|---|---|
| 29 | 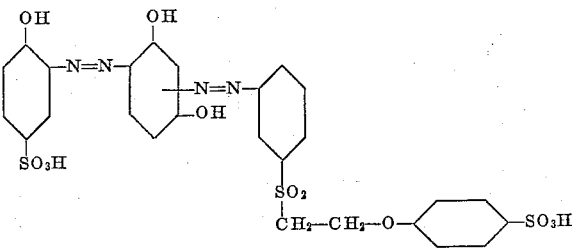 |
| 30 | 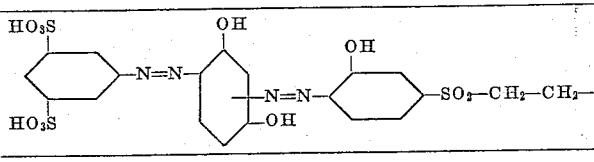 |
| 31 | 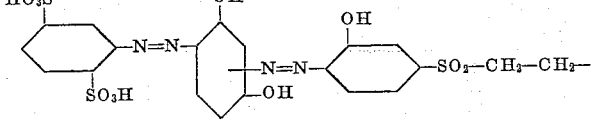 |
| 32 | 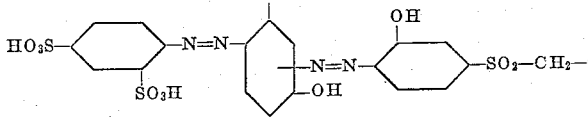 |
| 33 | 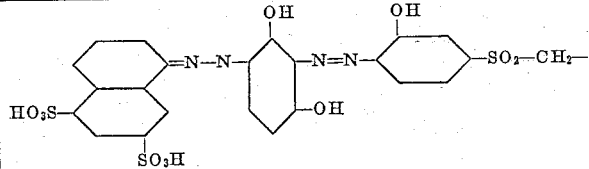 |
| 34 | 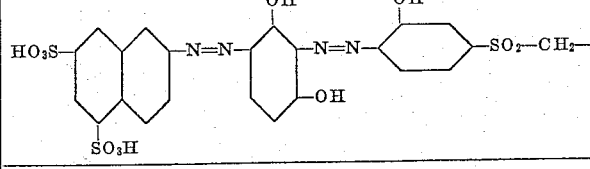 |
| 35 | 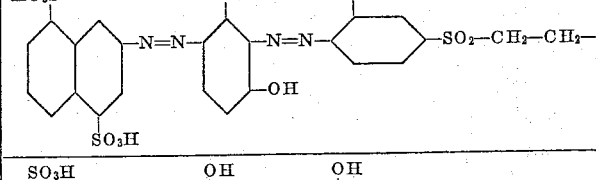 |
| 36 | 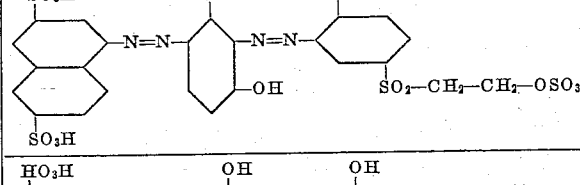 |
| 37 | 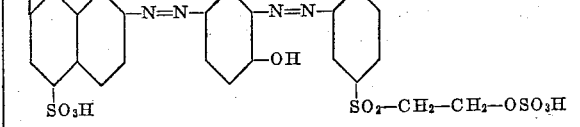 |

| Example of the table | Constitutional formula of the metal-free disazo-dyestuff |
|---|---|
| 38 | 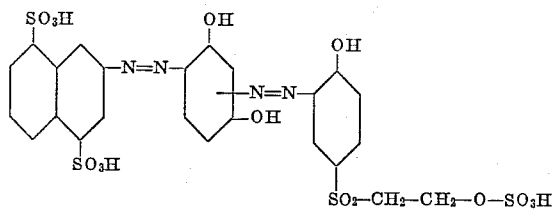 |
| 39 | 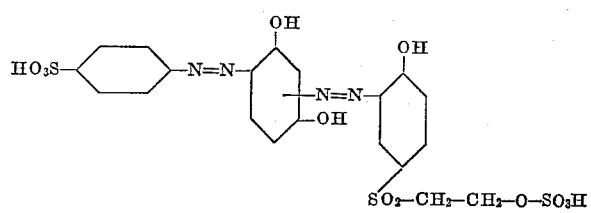 |

We claim:

1. A complex cobalt, chromium, copper or nickel compound of the dyestuff of the formula

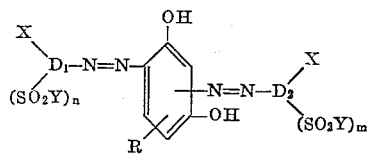

in which $D_1$ and $D_2$ represent phenyl or naphthyl, R represents hydrogen, methyl, carboxyl or sulfonic acid, one X represents hydroxy, methoxy or carboxyl in ortho-position to an azo group and the other X represents hydrogen, Y represents —CH=CH$_2$, —CH$_2$CH$_2$OSO$_3$H, —CH$_2$CH$_2$Cl,

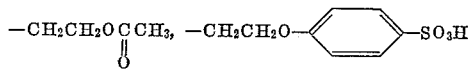

or —CH$_2$CH$_2$-N(lower alkyl)$_2$, n and m represent 0 or 1, the sum of n and m being 1 or 2, and wherein at least one of the $D_1$ and $D_2$ groups is substituted by a water-solubilizing group.

2. The 1:1-copper complex compound of the disazo-dyestuff of the formula

3. The 1:1-copper complex compound of the disazo-dyestuff of the formula

4. The 1:1-copper complex compound of the disazo-dyestuff of the formula

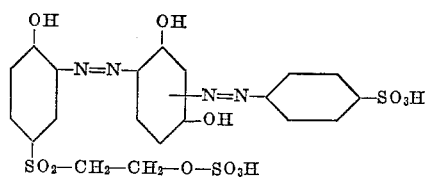

5. The 1:1-copper complex compound of the disazo-dyestuff of the formula

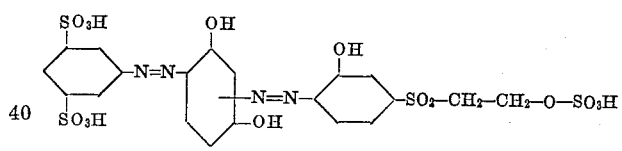

6. The 1:2-chromium complex compound of the disazo-dyestuff of the formula

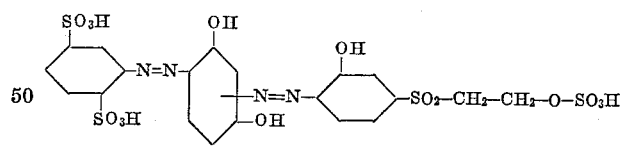

References Cited

UNITED STATES PATENTS

| 2,042,810 | 6/1936 | Straub et al. | 260—148 |
| 2,136,650 | 11/1938 | Crossley et al. | 260—148 XR |
| 2,257,165 | 9/1941 | Fellmer | 260—148 X |
| 2,438,754 | 3/1948 | Krebser et al. | 260—148 |
| 2,728,762 | 12/1955 | Heyna et al. | 260—147 |
| 3,114,745 | 12/1963 | Lodge et al. | 260—147 |
| 3,135,730 | 6/1964 | Heyna et al. | 260—147 |

FLOYD D. HIGEL, *Primary Examiner.*